Patented Feb. 3, 1925.

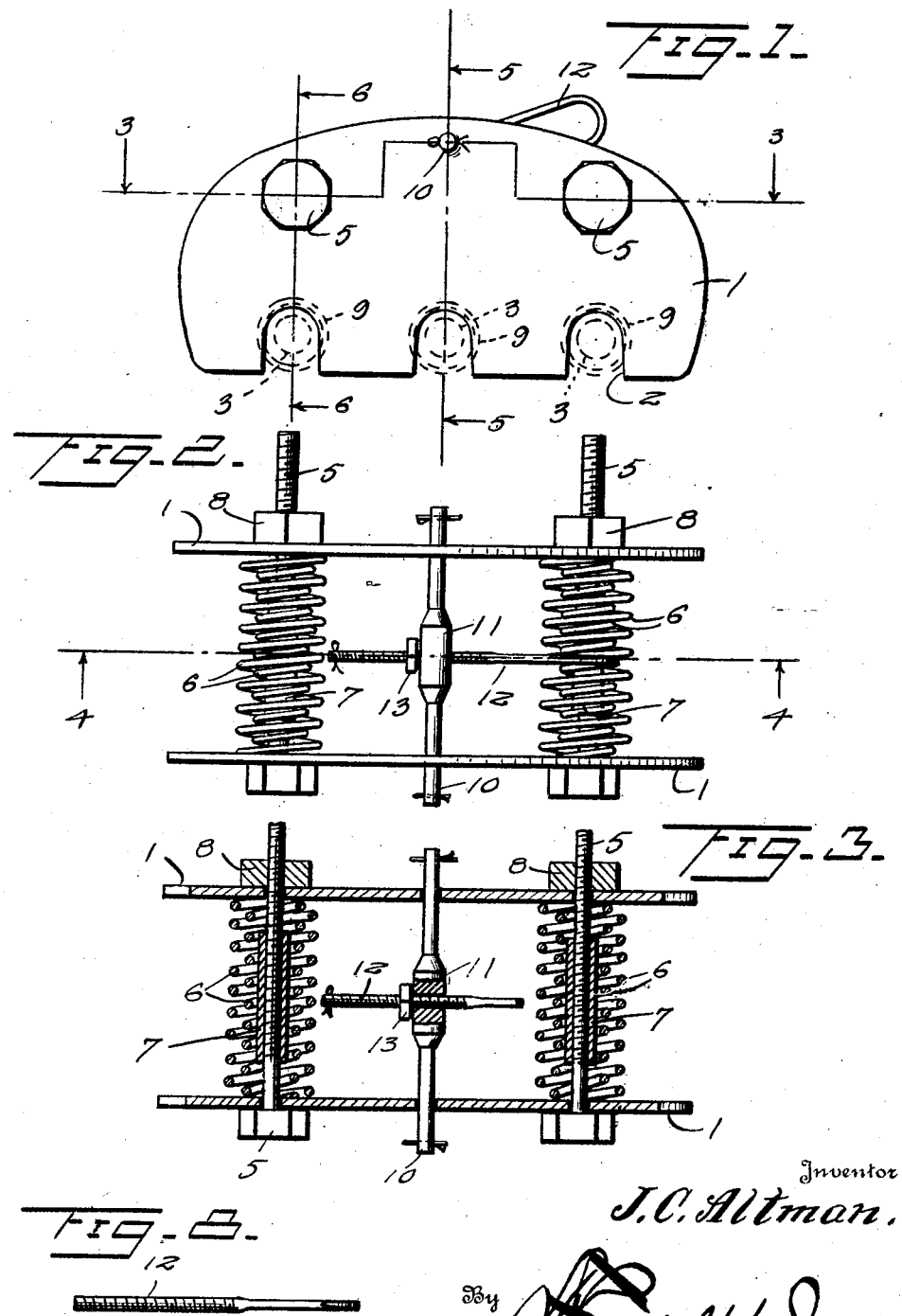

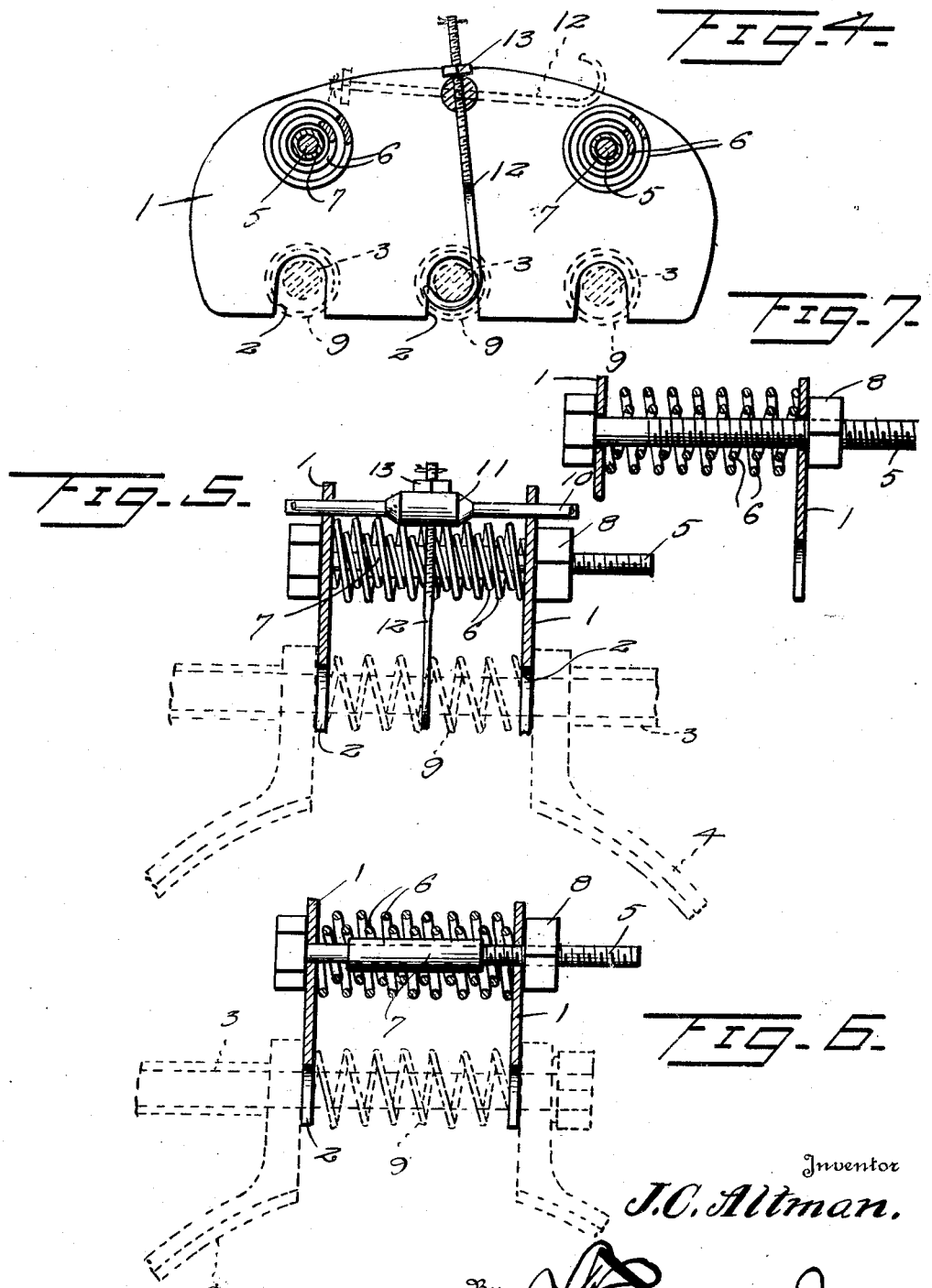

1,525,353

UNITED STATES PATENT OFFICE.

JOHN C. ALTMAN, OF LONGMONT, COLORADO.

SPRING-COMPRESSING TOOL.

Application filed December 8, 1923. Serial No. 679,416.

*To all whom it may concern:*

Be it known that I, JOHN C. ALTMAN, a citizen of the United States, residing at Longmont, in the county of Boulder and State of Colorado, have invented certain new and useful Improvements in Spring-Compressing Tools; and I do hereby declare the following to be a full, clear, and exact description of the invention, such as will enable others skilled in the art to which it appertains to make and use the same.

While the invention in its broad aspect is designed to provide a tool for compressing a spring, whereby to facilitate work in the assembling and separating of parts, it is designed with especial reference to furnish a tool for compressing the springs associated with the shafts of the transmission bands of the Ford motor, said springs being a source of trouble when replacing the transmission cover in the adjustment of the lugs of the transmission bands to the shafts of the pedals upon which the springs are mounted.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of a spring compressing tool embodying the invention,

Figure 2 is a top plan view thereof,

Figure 3 is a horizontal section on the line 3—3 of Figure 1,

Figure 4 is a vertical longitudinal section on the line 4—4 of Figure 2, looking in the direction of the arrows, Figure 5 is a transverse sectional view on the line 5—5 of Figure 1, Figure 6 is a transverse sectional view on the line 6—6 of Figure 1, Figure 7 is a detail view similar to Figure 6 embodying the sleeve on the bolt and showing the springs reversely disposed, and Figure 8 is a detail view of the hook for preventing displacement of the tool.

Corresponding and like parts are referred to in the following description and designated in the several views of the drawings by like reference characters.

The tool comprises similar or like side plates 1 adapted to stand the tension and having corresponding notches in their lower edges in coincident position to receive the pedal shafts 3 which coact with the transmission bands 4 of the Ford automobile. A pair of bolts 5 connects the plates 1 and each bolt receives inner and outer coil springs 6 of either spire, a sleeve 7 being mounted upon each of the bolts to space the spring therefrom. A nut 8 cooperates with each of the bolts 5 and serves to draw the plates 1 together against the tension of the springs 6 and thereby compress the springs 9 mounted upon the pedal shafts 3. A pin 10 mounted centrally in the upper edge portion of the plates 1 has its middle portion 11 enlarged and apertured to receive the threaded end of a hook 12 which is adapted to engage the middle pedal shaft 3 and prevent displacement of the tool when in operative position.

The tool is placed in position by adjusting the same to the pedal shafts 3 to cause them to enter the notches 2 in the lower edges of the side plates 1 and so as to come between the ends of the springs 9 and the lugs at the ends of the transmission bands 4. The hook 12 is now adjusted to engage the middle pedal shaft 3 and the nut 13 thereon is adjusted to hold the hook in place. The nuts 8 are now adjusted to compress the springs 6 and draw the plates 1 together, thereby compressing the springs 9, whereby the transmission cover, together with the pedal shafts 3 and the bearings 9 thereon, may be easily and conveniently replaced after the transmission bands have been relined or replaced. Then the hook 12 which is so made as to go down easily is readjusted and the compressing tool taken off. By just being lifted, the springs on the shafts will slip in their places.

In Figure 7 the sleeve 7 is omitted and the springs 6 are reversely disposed so that the turns of one incline in an opposite direction to the turns of the other. In this case the bolt 5 is heavier.

What is claimed is:

1. A spring compressing tool comprising side plates, bolts connecting and serving to draw the side plates together, helical springs mounted upon the bolts and normally exerting a pressure to separate the side plates, a pin mounted in the side plates, and a holding device carried by the pin to retain the tool in operative position.

2. A spring compressing tool comprising similar side plates having corresponding notches in their lower edges, bolts for connecting and drawing the side plates together, helical springs mounted upon the bolts and normally tending to press the side plates apart, sleeves on the bolts and serving to prevent contact of the helical springs therewith, a pin mounted centrally in the upper portion of the side plates, and a hook adjustably connected with the pin and serving to hold the tool in operative position.

In testimony whereof I affix my signature in presence of two witnesses.

JOHN C. ALTMAN.

Witnesses:
WALTER T. COON,
W. C. COULEHAN.